United States Patent
Trowbridge, Jr. et al.

(10) Patent No.: US 7,908,118 B2
(45) Date of Patent: Mar. 15, 2011

(54) SYSTEM AND METHODS FOR TESTING, MONITORING, AND REPLACING EQUIPMENT

(75) Inventors: Jack I. Trowbridge, Jr., Bend, OR (US); Ricky L. Wright, Prineville, OR (US); Delano S. Richie, Montgomery, TX (US); David D. Barton, Houston, TX (US)

(73) Assignee: MacSema, Inc., Bend, OR (US)

( * ) Notice: Subject to any disclaimer, the term of this patent is extended or adjusted under 35 U.S.C. 154(b) by 228 days.

(21) Appl. No.: 12/287,300

(22) Filed: Oct. 7, 2008

(65) Prior Publication Data

US 2009/0037146 A1 Feb. 5, 2009

Related U.S. Application Data

(63) Continuation-in-part of application No. 11/600,298, filed on Nov. 14, 2006, now Pat. No. 7,680,625.

(60) Provisional application No. 60/736,788, filed on Nov. 14, 2005, provisional application No. 60/789,854, filed on Apr. 5, 2006.

(51) Int. Cl.
*G21C 17/00* (2006.01)

(52) U.S. Cl. ............ 702/182; 702/113; 702/56; 702/51; 73/49.1; 73/592; 73/622; 73/866.5; 73/623; 340/605; 340/683; 340/606

(58) Field of Classification Search .................... 702/51, 702/150, 113, 56, 54, 182; 73/49.1, 592, 73/622, 542, 4.52, 40, 152.58, 809, 587, 73/866.5, 623; 340/605, 689, 683, 681, 603, 340/606, 539
See application file for complete search history.

(56) References Cited

U.S. PATENT DOCUMENTS

| | | | | |
|---|---|---|---|---|
| 3,958,451 A | * | 5/1976 | Richardson | ............... 73/644 |
| 3,996,735 A | | 12/1976 | Zurcher | |
| 4,578,573 A | | 3/1986 | Flies et al. | |

(Continued)

FOREIGN PATENT DOCUMENTS

JP 62083608 A * 4/1987

OTHER PUBLICATIONS

International Search Report and Written Opinion, PCT Application No. PCT/US2006/044267, Apr. 9, 2008, 9 pages.

(Continued)

*Primary Examiner* — Carol S Tsai
(74) *Attorney, Agent, or Firm* — Kolisch Hartwell, P.C.

(57) ABSTRACT

A system and method for testing and replacing equipment are disclosed. The system may include a first memory module configured to store first characteristics of the first equipment; a second memory module configured to store second characteristics of the second equipment; and a portable reader configured to read the first and second memory modules and to compare the second characteristics with the first characteristics to determine if the second equipment is a suitable replacement for the first equipment. The method may include storing first characteristics of a first equipment on a first memory module; transmitting the first characteristics to a portable reader; measuring second characteristics of a second equipment using a measuring device associated with the portable reader; and comparing, with the portable reader, the second characteristics with the first characteristics to determine if one of the first and second equipment is a suitable replacement for the other equipment.

14 Claims, 6 Drawing Sheets

U.S. PATENT DOCUMENTS

| | | | |
|---|---|---|---|
| 4,721,849 A | | 1/1988 | Davis et al. |
| D296,330 S | | 6/1988 | Davis et al. |
| 4,752,911 A | | 6/1988 | Prevost et al. |
| 4,860,228 A | | 8/1989 | Carroll |
| 4,868,409 A | | 9/1989 | Tanaka et al. |
| 4,935,195 A | * | 6/1990 | Palusamy et al. ............. 376/249 |
| 4,965,828 A | | 10/1990 | Ergott, Jr. et al. |
| 4,982,371 A | | 1/1991 | Bolan et al. |
| 4,999,742 A | | 3/1991 | Stampfli |
| 5,001,670 A | | 3/1991 | Slate et al. |
| 5,058,074 A | | 10/1991 | Sakamoto |
| 5,070,500 A | | 12/1991 | Horinouchi et al. |
| 5,091,771 A | | 2/1992 | Bolan et al. |
| 5,163,025 A | | 11/1992 | Chamberlain |
| 5,173,876 A | | 12/1992 | Kawashima et al. |
| 5,191,554 A | | 3/1993 | Lee |
| 5,196,374 A | | 3/1993 | Hundt et al. |
| 5,197,026 A | | 3/1993 | Butler |
| 5,206,818 A | * | 4/1993 | Speranza ......................... 702/24 |
| 5,206,938 A | | 4/1993 | Fujioka |
| 5,351,718 A | | 10/1994 | Barton |
| 5,506,757 A | | 4/1996 | Brorby |
| 5,539,252 A | | 7/1996 | Brorby |
| 5,576,936 A | | 11/1996 | Brorby |
| 5,615,247 A | | 3/1997 | Mills |
| 5,858,500 A | | 1/1999 | MacPherson |
| 5,939,954 A | | 8/1999 | Kim et al. |
| 5,939,984 A | | 8/1999 | Brady et al. |
| 6,023,986 A | * | 2/2000 | Smith et al. .................. 73/866.5 |
| 6,046,676 A | | 4/2000 | Ward et al. |
| 6,147,604 A | | 11/2000 | Wiklof et al. |
| 6,166,914 A | | 12/2000 | Sugiyama et al. |
| 6,189,384 B1 | * | 2/2001 | Piety et al. ....................... 73/592 |
| 6,220,098 B1 | * | 4/2001 | Johnson et al. ................. 73/592 |
| 6,243,657 B1 | * | 6/2001 | Tuck et al. .................... 702/150 |
| 6,265,973 B1 | | 7/2001 | Brammell et al. |
| 6,356,197 B1 | | 3/2002 | Patterson et al. |
| 6,499,349 B1 | | 12/2002 | Aronsson |
| 6,567,006 B1 | * | 5/2003 | Lander et al. ................. 340/605 |
| 6,813,949 B2 | * | 11/2004 | Masaniello et al. ............ 73/623 |
| 6,859,757 B2 | | 2/2005 | Muehl et al. |
| 6,957,157 B2 | * | 10/2005 | Lander ............................ 702/56 |
| 7,009,517 B2 | | 3/2006 | Wood |
| 7,027,955 B2 | | 4/2006 | Markwitz et al. |
| 7,032,814 B2 | | 4/2006 | Blankenship |
| 7,043,373 B2 | * | 5/2006 | Pittalwala et al. .............. 702/34 |
| 7,076,532 B2 | | 7/2006 | Craik |
| 7,106,198 B2 | | 9/2006 | Phipps et al. |
| 7,266,992 B2 | * | 9/2007 | Shamout et al. ............ 73/40.5 A |
| 7,383,318 B2 | | 6/2008 | Craik |
| 7,523,667 B2 | * | 4/2009 | Brown et al. .................... 73/592 |
| 7,526,944 B2 | * | 5/2009 | Sabata et al. .................... 73/49.1 |
| 2002/0180588 A1 | | 12/2002 | Erickson et al. |
| 2002/0186134 A1 | | 12/2002 | Rehfus et al. |
| 2004/0066296 A1 | | 4/2004 | Atherton |
| 2004/0135668 A1 | | 7/2004 | Hoffer et al. |
| 2005/0225427 A1 | | 10/2005 | Bell et al. |
| 2005/0269394 A1 | | 12/2005 | Ozer |
| 2005/0279169 A1 | * | 12/2005 | Lander ........................... 73/592 |
| 2006/0009856 A1 | | 1/2006 | Sherman et al. |
| 2006/0074570 A1 | * | 4/2006 | Belke et al. ..................... 702/50 |
| 2006/0097847 A1 | | 5/2006 | Bervoets |
| 2006/0113371 A1 | | 6/2006 | Robson et al. |
| 2006/0133609 A1 | | 6/2006 | Rodriguez et al. |
| 2006/0136177 A1 | * | 6/2006 | Patanian ....................... 702/187 |
| 2006/0145876 A1 | | 7/2006 | Kimura et al. |
| 2006/0208089 A1 | | 9/2006 | Sadler et al. |
| 2006/0208853 A1 | | 9/2006 | Kung et al. |
| 2006/0288756 A1 | * | 12/2006 | De Meurechy ................ 73/1.01 |
| 2008/0150727 A1 | * | 6/2008 | Hatori et al. ................ 340/572.8 |

OTHER PUBLICATIONS

MacSema, Inc., "What is a Contact Memory Button", Sep. 8, 2002, 2 pages.

MacSema, Inc., "ButtonReader", Sep. 8, 2002, 1 page.

MacSema, Inc., "MiniButton", Feb. 4, 2003, 1 page.

Thermo Fisher Scientific Inc., "Safeguarding Test Data Integrity With the Electronic Position Indicator", 2008, 3 pages.

MacSema, Inc., "Handheld-Analyzer Application—Handheld User's Guide", *MacSema_Niton_User's_Guide_v102[1]*, 2008, 17 pages.

International Atomic Energy Agency, "Development of Protocols for Corrosion and Deposits Evaluation in Pipes by Radiography", IAEA-TECDOC-1445, Apr. 2005, pp. 1-107.

The American Society for Nondestructive Testing, "Introduction to Nondestructive Testing", www.asnt.org/ndt/primer1.htm, 2005, 21 pages.

Olympus, "Tube and Pipe Weld Inspection", www.olympus-global.com, 2 pages.

R/D Tech, "Tube and Pipe Weld Inspection Using OmniScan™ PA", www.rd_tech.com, rev. Jul. 2004, 2 pages.

* cited by examiner

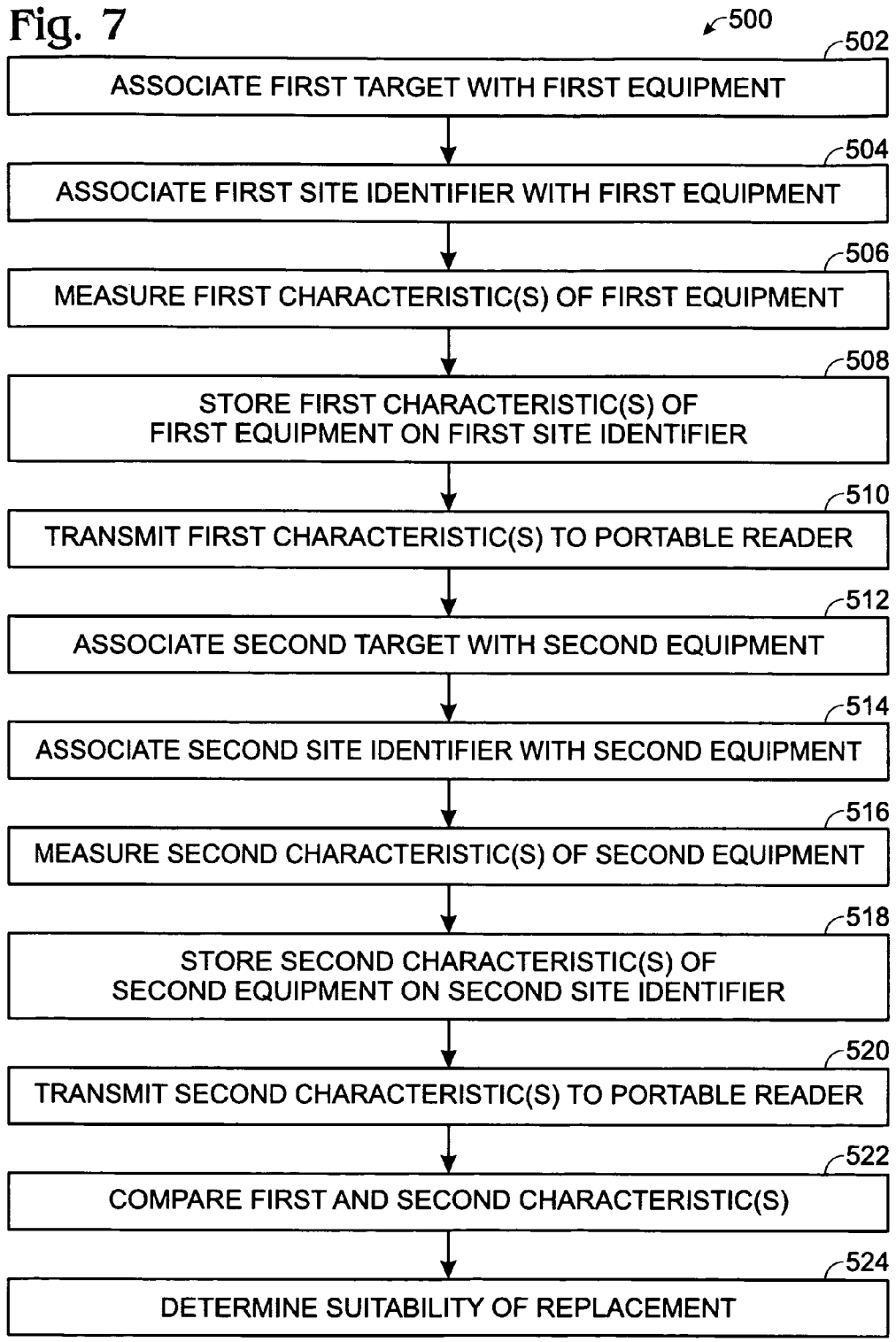

SYSTEM AND METHODS FOR TESTING, MONITORING, AND REPLACING EQUIPMENT

CROSS-REFERENCE TO RELATED APPLICATIONS

This application is a continuation-in-part application of U.S. patent application Ser. No. 11/600,298, filed Nov. 14, 2006 now U.S. Pat. No. 7,680,625 and entitled "Systems and Methods for Monitoring System Performance," which claims priority under 35 U.S.C. §119(e) to U.S. Provisional Application Ser. No. 60/736,788, filed Nov. 14, 2005 and entitled "System Integrity Monitoring Device and Process," and U.S. Provisional Application Ser. No. 60/789,854, filed Apr. 5, 2006 and entitled "System Integrity Monitoring Device and Process." The complete disclosures of the above applications are herein incorporated by reference for all purposes.

BACKGROUND OF THE DISCLOSURE

Generally, pipe is used in the nuclear, petrochemical, and other industries for transporting fluids. A system or network of pipes and other equipment may be set up around a facility in an intricate, non-linear fashion. The transported fluids in the network may be corrosive, toxic, hazardous, reactive, combustible, and/or flammable. Those fluids also may be under high temperatures and/or pressures. Thus, equipment must be made of materials that are compatible with the transported fluids, operating conditions, and/or other factors. Additionally, when the equipment is replaced, the replacement equipment must be made of compatible materials. This scenario applies to all equipment of a process system, including pipes, tanks, support structures and other components of the system.

Even when the proper components are used, the transported fluids and/or other factors may cause the components to degrade over time by corrosion, erosion, depositing, or blockage. That degradation may result in leakages, explosions, or other undesirable results. Leaks or fugitive emissions also may occur along pipe at flanges, joints, valves, vessels, etc. Monitoring the performance and/or integrity of the components, such as wall thickness, may allow operators to replace the components before any significant degradation.

BRIEF DESCRIPTION OF THE DRAWINGS

FIG. 7 is a flow chart depicting an example of a method for replacing equipment.

DETAILED DESCRIPTION OF THE DISCLOSURE

Figure 1:
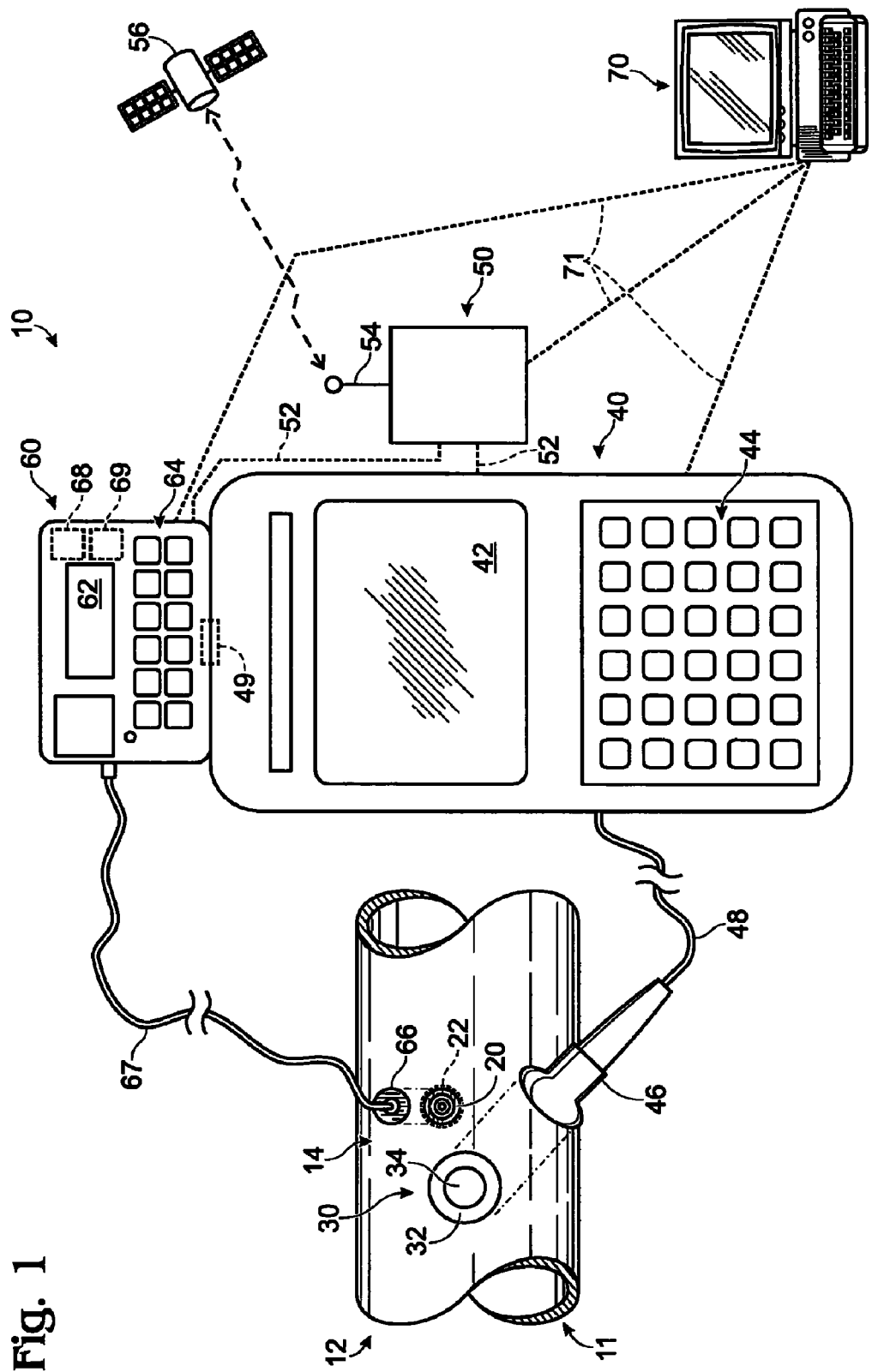
FIG. 1 is a schematic view of an example of a system for testing, monitoring, and/or replacing equipment.

Referring to FIG. 1, a system 10 for testing, monitoring, and/or replacing equipment 11, such as a pipe network 12 having plural inspection sites 14, may include a site identifier 20, a target 30, a measuring instrument or device 40, a location device 50, a data collection device or portable reader 60, and a remote processor or database 70.

Site identifier 20 may be associated with one or more inspection sites 14 for the equipment, which may be on the field (such as along pipe network 12), being used, being repaired, and/or in inventory. Site identifier 20 may, for example, be associated with, or attached to, the equipment adhesively, mechanically, or by any other suitable method. Site identifier 20 may be associated with inspection site 14 at any suitable spot, location, point, position, etc. Site identifier 20 also may form a part of the equipment. The phrase "associated with" may mean that site identifiers 20 are located, attached, and/or positioned at any point, position, location, spot, place, etc. in any suitable way in, on, near, adjacent to, and/or along the equipment.

In some embodiments, a single site identifier 20 may be associated with plural inspection sites 14. Alternatively, or additionally, plural site identifiers 20 may be associated with a single inspection site 14. For example, one site identifier may be used to store a first set of data, such as performance parameters and associated identity/testing information, and another site identifier may be used to store a second set of data, such as characteristics and associated identity/testing information. When more than one site identifier is used for a single inspection site, such as to store different sets of data, those site identifiers (and/or associated targets) may be distinguished by color coding, different labels, and/or other suitable methods.

Figure 2:
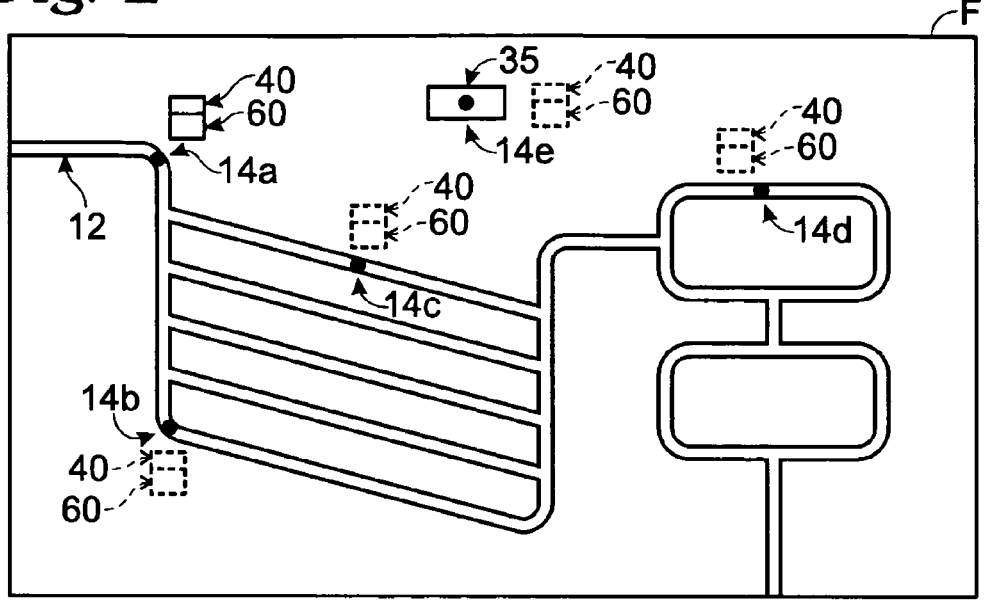
FIG. 2 is a schematic view of an example of a facility with a pipe network and other equipment having plural inspection sites.

Site identifier 20 may be any device that allows for unique identification of inspection sites 14. For example, site identifier 20 may be a memory module, a radio-frequency identification (RFID) device, a bar-code, and/or any other suitable data-storage device read and/or written by electrical, magnetic, infrared, optical, optical character recognition (OCR), and/or any other suitable technology. In some embodiments, site identifier 20 may be configured to be written to once. Site identifier 20 may alternatively, or additionally, be configured for read only access. As illustrated in FIG. 2, site identifiers 20 may be associated with one or more inspection sites 14 for equipment 11. Although plural inspection sites 14 may be employed, for simplicity of disclosure, only a single inspection site 14 is shown in FIG. 1.

Although a particular memory module configuration is shown in FIG. 1, the memory module may take any of a variety of forms, and may include any suitable structure configured to retain or store data. As used herein, the term "data" may refer to singular or plural information, parameters, quantities, characters, files, symbols, etc. in any electronic, written, and/or other suitable format. The memory module may include any number of electronic and/or other devices, including nonvolatile memory, volatile memory, microprocessors, clocks, sensors, etc. The memory module may utilize any of a variety of memory technologies, including semiconductor memory, magnetic storage media, optical storage media, etc.

The memory module may be equipped with an interface for accessing data stored in the memory, such as to add data to memory, retrieve data from memory, overwrite data in memory, and/or erase data in memory. In some embodiments, the interface may include one or more electrical contacts through which a signal may pass. Other interfaces may alternatively, or additionally, be used. For example, in some embodiments, the memory module may include a wireless or contactless interface providing access to stored data on the memory module.

As used herein, "store," "stored," and "storage" mean that data is at least temporarily placed in memory for retrieval later. Stored data may be temporarily stored or permanently stored. Temporarily stored data may be subsequently erased or overwritten with other data, while permanently stored data may not be subsequently erased or overwritten with other data. Data may be stored in any suitable format, which may be with or without compression, encryption, and/or password protection.

In some embodiments, the memory module may be a contact memory button (CMB) manufactured by MacSema, Inc. In some embodiments, the memory module may be an iButton® manufactured by Dallas Semiconductor. Other examples of memory modules are described in U.S. Pat. Nos. 5,576,936; 5,506,757; and 5,539,252; and U.S. Patent Application Publication No. 2004/0135668. The complete disclosures of the above patents and patent application are herein incorporated by reference for all purposes.

Memory module(s) associated with a respective inspection site 14 may allow for storage and/or retrieval of one or more types of data. For example, the memory module may allow for storage and/or retrieval of one or more identity and/or testing information, such as a unique inspection site identifier (e.g., a serial number), site location data of a corresponding inspection site 14, a last monitoring or testing date corresponding to inspection site 14, the identity of the last user who performed an inspection at inspection site 14, duration of testing performed (e.g., trigger time) at inspection site 14, drawing identification number, identity of person who replaced the equipment, etc.

Additionally, or alternatively, the memory module may allow for storage and/or retrieval of one or more performance (or historical or unique performance) parameters, which may be related to monitoring integrity, emissions, temperature, pressure, chemical compositions, flow-rates, and/or for any other conditions and/or issues that may be monitored using system 10. For example, performance parameters may include a nominal wall thickness corresponding to inspection site 14, a minimal wall thickness corresponding to inspection site 14, a current wall thickness measurement corresponding to inspection site 14, a last wall thickness measurement on the last date monitored corresponding to inspection site 14, etc.

The memory module may additionally, or alternatively, allow for storage and retrieval of one or more characteristics of the equipment, such as a material type or material classification corresponding to inspection site 14, percentage compositions of one or more elements corresponding to inspection site 14, dimensional information (e.g., diameter, length, width) corresponding to the inspection site, flange type, gasket type, pump type, etc. Examples of material classifications may include 1¼, 2¼, 5, 9, and 12 Cr, Titanium, Monel, Inconel, Hastaloy, A-53 Gr B (carbon steel), A-106 Gr B (carbon steel), etc. Examples of elements may include Sb, Sn, Pd, Ag, Al, Mo, Nb, Zr, Bi, Pb, Se, W, Zn, Cu, Ni, Co, Fe, Mn, Cr, V, Ti, Sb, Sn, Pd, Ag, Al, Nb, Zr, Bi, Pb, Se, W, Zn, Cu Ni, Co, V, Ti, etc.

System 10 may include a cover 22 that may be configured to protect site identifier 20. Cover 22 may be temporarily secured over site identifier 20 to shield site identifier 20 from potential damage. Cover 22 may be held in place by frictional, magnetic, and/or mechanical force, and/or by other means.

Target 30 may include a target rim 32 and a hole 34. Target 30 may be attached to equipment 11 adhesively, mechanically, or by any other suitable method. Target 30 may take any convenient shape, including circular, oblong, square, or rectilinear. Target 30 may be associated with one or more inspection sites 14 to define a data collection point at such inspection site 14. The data collection point may be a point, position, spot, and/or location on the equipment for collecting data, such as performance and/or characteristic data.

Hole 34 may be fittably sized to receive a sensor 46 of measuring device 40. The data collection point may be defined as a point that may be fittably sized to receive sensor 46 for collecting data. Target 30 may be advantageous for generating a consistent (e.g., accurate and/or precise) measurement for collecting data at inspection site 14. Target 30 may indicate the data collection point in any suitable way. In some embodiments, target 30 and site identifier 20 may form a unitary component associated with, or attached at, inspection site 14. The unitary component may be a plate to which site identifier 20 may be attached and comprised of target 30 including 34. The plate may be metal, plastic, and/or any other suitable material.

FIG. 2 shows an illustrative facility or factory F including a pipe network 12 and other equipment 35 that may be separate from the pipe network (such as operating separate from the pipe network, in inventory, being repaired, etc.). Pipe network 12 may include a network of pipes, flanges, fasteners, vessels, pressure vessels, equipment supports, pipe racks, etc. located around and throughout facility or factory F.

Figure 3:
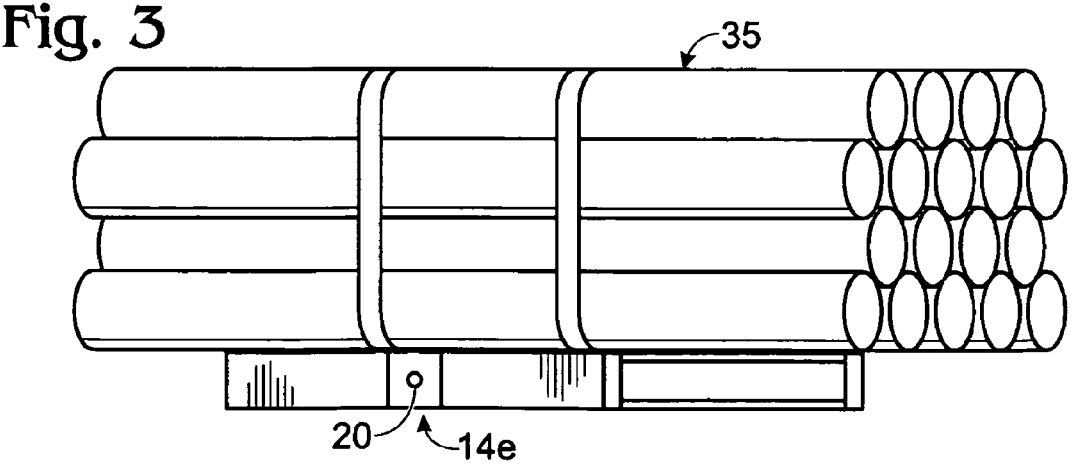
FIG. 3 is an isometric view of an example of other equipment in FIG. 2.

Other equipment 35 may include a container that at least partially contains one or more replacement equipment. For example, other equipment 35 may include a pallet with a plurality of replacement pipes, as shown in FIG. 3. Inspection site 14e may be associated with other equipment 35 and may include one or more site identifiers 20. Those site identifiers may be associated with the equipment in any suitable way. For example, a single site identifier may be attached to a pallet, as shown in FIG. 3. Alternatively, or additionally, site identifier 20 may be attached to a door leading to a room or area with other equipment 35. Additionally, or alternatively, the site identifier may be attached to the other equipment.

In some embodiments, the pipe network and/or the other equipment may be located around and throughout a plant, a power plant, a ship, a submarine, and/or in any other location. Pipe network 12 may include multiple pipes with one or more pipes configured to carry different fluids. Pipe network 12 may include any type(s) of material, including metals, plastics, etc. Plural inspection sites 14 may be associated with pipe network 12 and other equipment 35.

For illustrative purposes, inspection sites 14a, 14b, 14c, and 14d may be associated with pipe network 12, and inspection site 14e may be associated with equipment 35. In some embodiments, pipe network 12 and/or equipment 35 may have as many inspection sites 14 as suitable, including hundreds or even thousands of inspection sites. A site identifier 20 and a target 30 may be associated with and/or attached at one or more inspection sites 14. Portable reader 60 and/or measuring device 40 may be transported to any of inspection sites 14a-e for reading, collecting, and/or storing data.

Now returning to FIG. 1, system 10 may include measuring device 40. Measuring device 40 may include a screen 42, a plurality of keys 44, a sensor 46, a first connector 48, and a second connector 49. Measuring device 40 may be operable to make certain suitable measurements of inspection site 14. Measuring device 40 may be operable to collect data of inspection site 14. The data may be related to integrity, emissions, material type or material classification, percentage composition of one or more elements, dimensional information, temperature, pressure, chemical compositions, flow-rates, and/or for any other conditions and/or issues for which data may be collected using system 10.

Screen 42 may be configured to view data stored in measuring device 40. Keys 44 may include an on/off key, a calibration key, a plurality of key pad keys, a set of scroll left/right keys, and/or a set of scroll up/down keys. In some embodiments, measuring device 40 may include a touch-pad, a touch-screen, voice input and/or another suitably configured data entry device and/or tool. Measuring device 40 may be configured to control partially or entirely the operation of location device 50 and/or portable reader 60. Alternatively, measuring device 40 may act as a peripheral to another device, such as location device 50 and/or portable reader 60, where location device 50 and/or portable reader 60 may be configured to control partially or entirely the operation of measuring device 40.

Sensor 46 may be configured to make measurements and/or collect identity/testing, performance, and/or characteristic data of inspection site 14. In some embodiments, sensor 46 may be fittably configured to fit into rim 32 on target 30 associated with inspection site 14. Sensor 46 may transmit or send data, including identity/testing, performance, and/or characteristic data, to measuring device 40 of a selected or present inspection site 14 being measured via a first connector 48.

First connector 48 may allow data to pass between measuring device 40 and sensor 46. First connector 48 may connect measuring device 40 to sensor 46. First connector 48 may create an electrical connection, an optical connection, a radio frequency (RF) connection, a wireless connection, and/or any other suitable type(s) of connections. For example, first connector 48 may be a cable.

In some embodiments, measuring device 40 may measure the performance and/or characteristics of equipment 11 using ultrasonic inspection, mechanical inspection, optical inspection, electromagnetic and electronic inspection, thermal inspection, chemical and analytical inspection, x-ray fluorescence, spark emission spectrography, infrared thermography, magnetic flux leakage (MFL), radioisotope gamma radiometry, radiography, and/or any other suitable methods. Measuring device 40 may collect identity/testing, performance, and/or characteristic data from the measurements.

In some embodiments, the data may include a current wall thickness of inspection site 14. Methods used to measure and monitor wall thickness include ultrasonic, visual, mechanical, optical, electromagnetic, electronic, thermal, chemical, and analytical inspection as well as infrared thermography, magnetic flux leakage (MFL), radioisotope gamma radiometry, and radiography. For example, measuring device 40 may be an ultrasound device, such as a Panametrics Corrosion Thickness Gage 37DL Plus. Measuring device 40 may be a modified Panametrics Thickness Gage 37DL Plus. The Panametrics Thickness Gage 37DL Plus may be controlled entirely or in part by portable reader 60. Measuring device 40 may be a Krautkramer DMS2E. Measuring device 40 may be a modified Krautkramer DMS2E. The Krautkramer DMS2E may be controlled entirely or in part by portable reader 60.

Additionally, or alternatively, the data may include percentage compositions of one or more elements of the equipment, and material classifications determined based on those percentage compositions. Methods used to measure percentage compositions of one or more elements of the equipment include x-ray fluorescence and spark emission spectrography. For example, measuring device 40 may be an x-ray fluorescence device, such as a Niton XL3t XRF Analyzer. The Niton XL3t may be controlled entirely or in part by portable reader 60.

Measuring device 40 may be connected to portable reader 60 via a second connector 49. Second connector 49 may allow measuring device 40 and portable reader 60 to connect and/or interface. Second connector 49 may allow data to pass between measuring device 40 and portable reader 60. Second connector 49 may be in the form of an electrical connection, an optical connection, an RF connection, a wireless connection, and/or any other suitable type of connection. For example, second connector 49 may be a cable. Sensor 46 may communicate with portable reader 60 via first connector 48 and second connector 49. That sensor may be connected via first connector 48 to portable reader 60, and may communicate with measuring device 40 via second connector 49 and/or with location device 50 via a third connector 52.

System 10 may include location device 50. Location device 50 may be any device capable of determining site location data. Location device 50 may be a global positioning satellite (GPS) device. The location device may be a Galileo positioning system device. Additionally, or alternatively, location device 50 may use GPS, Galileo, and/or any other suitable technology for gathering site location data. The location device may have an antenna 54 for receiving one or more signals from, for example, GPS satellites 56 and/or Galileo satellites 56. Location device 50 may have its own controls, and/or act as a peripheral to another device, such as portable reader 60 and/or measuring device 40, where portable reader 60 and/or measuring device 40 may be configured to control operation of location device 50. The location device may be configured to control partially or entirely the operation of measuring device 40 and/or portable reader 60.

Location device 50 may be permanently or temporarily connected via a third connector 52 with portable reader 60 and/or measuring device 40. Third connector 52 may allow location device 50 and portable reader 60 to connect and/or interface. The third connector may allow data to pass between location device 50 and portable reader 60. Additionally, or alternatively, third connector 52 may be in the form of an electrical connection, an optical connection, an RF connection, a wireless connection, and/or any other suitable type(s) of connection. For example, the third connector may be a cable. Portable reader 60 may store data passed from location device 50. Moreover, third connector 52 may allow location device 50 and measuring device 40 to connect and interface either by directly connecting third connector 52 to measuring device 40 or indirectly via portable reader 60.

Various site location data may be associated with a corresponding inspection site 14. Site location data may include a distance value and/or a direction value. The distance value may include a measurable distance between points (e.g., inches, feet, meters, etc.). The direction value may include coordinates or bearings (e.g., North, South, East, West, Up, Down, Left, Right, Starboard, Port, etc.). The distance value and the direction value, or any suitable combination of distance values and direction values, may be used to determine the location of a selected or destination inspection site 14. Site location data may be in any suitable format, such as latitude coordinates and longitude coordinates, GPS coordinates, Galileo coordinates, user-defined values or coordinates (e.g., "5 feet above the third door on the left"), and/or any suitable combination thereof.

As described above, site identifier 20 (e.g., the memory module) may store site location data corresponding to such inspection site 14 associated with site identifier 20. Portable reader 60 may store site location data corresponding to one or more inspection sites 14 in pipe network 12 and/or other equipment 35.

System 10 also may include portable reader 60. The portable reader may include a screen 62, a plurality of keys 64, a reader/writer 66, a fourth connector 67, an internal on-board memory 68, and a processor 69. Screen 62 may be configured to view data in portable reader 60. The screen also may be configured to view data in measuring device 40 and/or in location device 50. Portable reader 60 may be configured to partially or entirely control measuring device 40 and/or location device 50.

Keys 64 may include an on/off key, a calibration key, a plurality of key pad keys, a set of scroll left/right keys, and/or a set of scroll up/down keys. The keys may be configured to control portable reader 60. In some embodiments, portable reader 60 may include a touch-pad, a touch-screen, voice input, and/or another suitably configured data entry device or tool.

Portable reader 60 may be configured to control partially or entirely the operation of measuring device 40 and/or location device 50. Keys 64 also may be configured to control measuring device 40 (via second connector 49), and/or location device 50 (via third connector 52). Alternatively, or additionally, portable reader 60 may act as a peripheral to another device, such as measuring device 40 and/or location device 50. Furthermore, measuring device 40 and/or location device 50 may be configured to control partially or entirely the operation of portable reader 60.

Portable reader 60 and site identifier 20 may be complementary-configured for allowing data, and/or parameters to pass. In some embodiments, reader/writer 66 may be associated with portable reader 60 and site identifier 20 may be complementary-configured so that portable reader 60 may read data from, erase data of, and/or write data to site identifier 20. An interface on reader/writer 66 may be aligned with an interface on site identifier 20 so that data may be transferred between reader/writer 66 and site identifier 20. Reader/writer 66 may transmit data to and/or from site identifier 20 electrically, optically, with radio waves, and/or with infrared waves, etc. Reader/writer 66 may be a sensor and/or probe.

Reader/writer 66 may send and/or retrieve data from portable reader 60 via fourth connector 67. Fourth connector 67 may allow data to pass between portable reader 60 and reader/writer 66. The fourth connector may connect portable reader 60 to reader/writer 66. Fourth connector 67 may be in the form of an electrical connection, an optical connection, an RF connection, a wireless connection, and/or any other suitable types of connections. For example, fourth connector 67 may be a cable.

Reader/writer 66 may communicate with measuring device 40 via fourth connector 67 and second connector 49, and/or with location device 50 via fourth connector 67 and third connector 52. The reader/writer may be connected to measuring device 40 via fourth connector 67, and/or may communicate with portable reader 60 via second connector 49 and/or with location device 50 via third connector 52.

Portable reader 60 may include internal on-board memory 68. The internal on-board memory may take any of a variety of forms, and may include any suitable structure configured to retain or store data. Internal on-board memory 68 may include any number of electronic and/or other devices, including nonvolatile memory, volatile memory, microprocessors, clocks, sensors, etc. Internal on-board memory 68 may utilize any of a variety of memory technologies, including semiconductor memory, magnetic storage media, optical storage media, etc. Internal on-board memory 68 may retain and/or store data for measuring device 40, location device 50, and/or portable reader 60.

Internal on-board memory 68 may store, and/or receive for storage, any suitable type(s) of data, such as one or more identity/testing information, one or more performance parameters, and/or one or more characteristics corresponding to one or more inspection sites 14. Additionally, or alternatively, the memory may store, and/or receive for storage, one or more standard characteristics associated with the equipment. The standard characteristics may include characteristics required or recommended for the equipment and/or the fluids handled by the equipment, such as minimum percentage compositions of certain elements. For example, the standard characteristics may be provided by one or more standards organizations, such as the American Society of Mechanical Engineers and the American Petroleum Institute.

Processor 69 may be configured to analyze, compute, and/or compare data retrieved by and/or stored in portable reader 60. The processor may analyze, compute, and/or compare data associated with a selected inspection site 14 in real-time and/or while at, near, around, adjacent to, and/or in proximity to the selected inspection site 14. Although memory 68, processor 69, and other components (such as screen 62 and keys 64) are shown to be internal to portable reader, the memory, the processor and/or the other components may alternatively, or additionally, be internal to measuring device 40 and/or location device 50.

In some embodiments, processor 69 may verify the one or more identity/testing information, one or more performance parameters, and/or one or more characteristics corresponding to and/or associated with a respective inspection site 14. Additionally, or alternatively, processor 69 may compare the data corresponding to and/or associated with a first inspection site with data of a second inspection site, and/or make a determination based on that comparison, such as whether a second equipment associated with the second inspection site is a suitable replacement for a first equipment associated with the first inspection site. Alternatively, or additionally, processor 69 may compare data corresponding to and/or associated with an inspection site with one or more standard characteristics for that site, and/or make a determination based on that comparison, such as whether the equipment associated with the inspection site meets the one or more standard characteristics.

Processor 69 may validate, e.g., the accuracy and/or precision, of the data in real time or while on-location at the present inspection site 14. Additionally, or alternatively, the processor may interpret the data in real time or while on-location at the present inspection site 14. Moreover, processor 69 may validate the data of the present inspection site 14 (and/or the performance of system 10) in real time or while on-location at the present inspection site 14.

In some embodiments, processor 69 may be configured to compare site location data of the present inspection site 14 with reference site location data to determine a location of a destination inspection site 14. The site location data corresponding to the destination inspection site 14, or any other inspection site 14, may be the reference site location data. Processor 69 may determine the location of the destination inspection site 14 without the use of location monitoring device 50. In some embodiments, portable reader 60 may be a suitably configured PDA device, notebook computer, and/or other suitable portable or hand-held computing or processing device. In some embodiments, portable reader 60 may be a BR3065 manufactured by MacSema, Inc., that communicates (e.g., reads/writes) with the contact memory button (CMB). The portable reader may transmit, download and/or upload data to the contact memory button.

The portable reader may control entirely, or in part, measuring device 40 and/or location device 50. The portable reader may communicate with measuring device 40 and/or location device 50 for transmitting data. For example, the Panametrics Thickness Gage 37DL Plus may be connected to the portable reader via second connector 49. Alternatively, Krautkramer DMS2E may be connected to the portable reader via second connector 49. As another example, the Niton XL3t XRF Analyzer may be connected to the portable reader via second connector 49.

In some embodiments, as illustrated in FIG. 1, portable reader 60 and measuring device 40 may form a unitary portable instrument. The unitary portable instrument may be configured so that one or more measuring devices 40, one or more location devices 50, one or more portable readers 60, and/or any suitable combination thereof may be integrated as one unit, integrated as connected components, or integrated in any suitable way. As shown in dashed lines in FIG. 2, the unitary portable instrument including portable reader 60 may be transported as needed to inspection sites 14 at the facility for monitoring. Measuring device 40 may be located at inspection site 14 for performing constant or real-time monitoring and/or other measurement(s).

In some embodiments, one or more components of portable reader 60 may be integrated with and/or contained in measuring device 40 and/or location device 50. For example, memory 68 and/or processor 69 may be integrated with and/ or contained in measuring device 40. Alternatively, or additionally, one or more components of measuring device 40 may be integrated with and/or contained in location device 50 and/or portable reader 60. For example, screen 42 and/or keys 44 may be integrated with and/or contained in portable reader 60. Additionally, or alternatively, one or more components of location device 50 may be integrated with and/or contained in measuring device 40 and/or portable reader 60.

System 10 may include remote processor or database 70. Remote database 70 may be any device allowing for storage, retrieval, and/or processing of data, such as a computer. Remote database 70 may contain any parts needed for storing, retrieving, and/or processing data, such as a memory module, a microchip, a screen, and a keyboard. For example, the remote database may take the form of a PDA, a laptop computer, and/or some other processing device with suitable firmware and/or software to accomplish the desired tasks. Remote database 70 may use a fifth connector 71 to interface with measuring device 40, location device 50, and/or portable reader 60, allowing data to pass. Fifth connector 71 may be in the form of an electrical connection, an optical connection, an RF connection, a wireless connection, and/or any other suitable type(s) of connection. For example, the fifth connector may be a cable.

Figure 4:
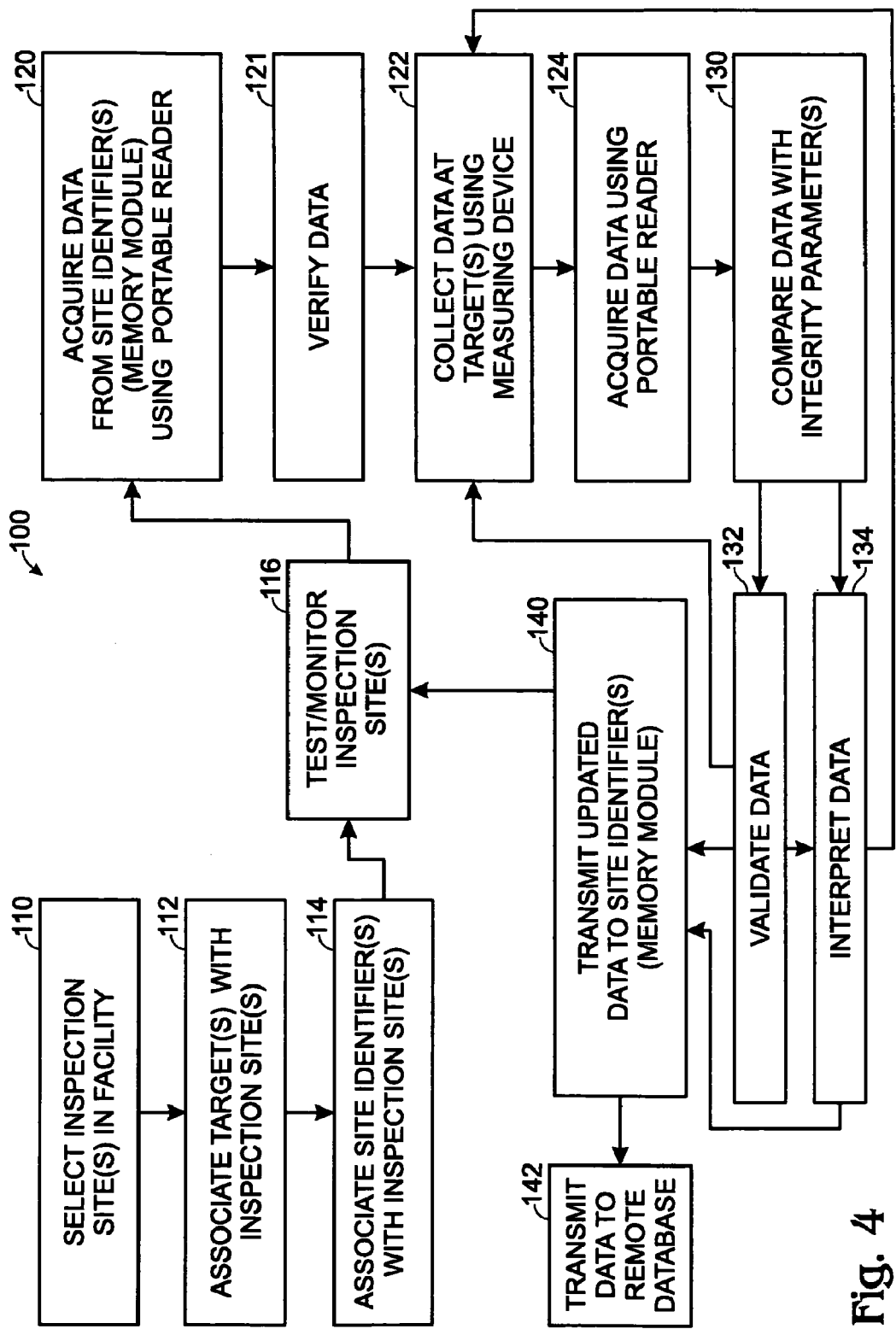
FIG. 4 is a flow chart depicting an example of a method for testing and/or monitoring inspection sites associated with equipment.

FIG. 4 is a flow chart depicting an example method 100 for monitoring inspection sites 14. At block 110, plural inspection sites 14 may be selected and associated with pipe network 12 and/or other equipment 35 in facility F. For example, inspection sites 14 may be associated with one or more pipes, fasteners, flanges, valves, vessel, pressure vessels, pumps, compressors, etc. At block 112, one or more targets 30 may be associated with one or more inspection sites 14.

At block 114, one or more site identifiers 20 may be associated with one or more inspection sites 14. Site identifier 20 may be configured to store and/or contain data associated with such inspection site 14. In some embodiments, site identifier 20 may be a memory module. Portable reader 60 and/or remote database 70 may be used to write to site identifier 20 the one or more identity/testing information, one or more performance parameters, and/or one or more characteristics associated with such inspection site 14.

At block 116, an inspection site 14 for monitoring and/or other measurement(s) may be selected. Portable reader 60 may be transported to the selected inspection site 14. A unitary portable instrument that may include portable reader 60, measuring device 40 and/or location device 50 may be transported to the selected inspection site 14. Using FIG. 2 as an example, inspection site 14a may be selected. The unitary portable instrument including portable reader 60 may be transported to inspection site 14a.

At block 120, the one or more identity/testing information, one or more performance parameters, and/or one or more characteristics stored on site identifier 20 associated with the selected inspection site 14 may be acquired by portable reader 60. Reader/writer 66 may read site identifier 20 to acquire that data. In some embodiments, portable reader 60 may acquire one or more identity/testing information, one or more performance parameters, and/or one or more characteristics from the memory module onsite and/or in real time. For example, as illustrated in FIG. 2, portable reader 60 may acquire the data corresponding to inspection site 14a while portable reader 60 may be located at or around inspection site 14a. Screen 62 of portable reader 60 may indicate that data was transmitted from site identifier 20 to portable reader 60.

Turning to block 121 of FIG. 4, portable reader 60 may be suitably programmed to compare the one or more identity/ testing information, one or more performance parameters, and/or one or more characteristics with data stored on portable reader 60 to verify that the data being compared matches. For example, portable reader 60 may compare the last pipe or wall thickness reading and the last date of the last pipe or wall thickness reading acquired at block 120 with data stored with portable reader 60 including a last pipe or wall thickness reading and a last date of a last pipe or wall thickness reading to verify that the data matches. Portable reader 60 may provide an alert if the data stored with portable reader 60 does not match the data stored with site identifier 20.

At block 122, measuring device 40 may collect identity/ testing data, performance data, and/or characteristic data of the selected inspection site 14. Sensor 46 of measuring device 40 may, for example, be placed in hole 34 on target 30 for taking a reading or measurement to collect the data. In some embodiments, the data collected by measuring device 40 may be the current pipe or wall thickness associated with inspection site 14, such as at hole 34 of target 30. Alternatively, or additionally, the data collected by the measuring device may include percentage compositions of one or more elements of the equipment associated with the inspection site. The performance data may be collected after a visual and/or other inspection without using measuring device 40. In some embodiments, measuring device 40 may collect plural performance and/or characteristic data over a predetermined time interval. The time interval may be in seconds, minutes, hours, days, etc.

At block 124, the identity/testing, performance, and/or characteristic data of block 122 may be acquired by portable reader 60. Portable reader 60 may acquire the data while onsite and/or in real time. For example, as illustrated in FIG. 2, portable reader 60 may acquire the data of inspection site 14a while portable reader 60 may be located at or around inspection site 14a.

Portable reader 60 may be configured to manually receive the data. In some embodiments, keys 64 may be used to manually type into portable reader 60 the identity/testing, performance, and/or characteristic data. In some embodiments, pressing a key 64 may cause portable reader 60 to communicate with measuring device 40 to retrieve the collected identity/testing, performance, and/or characteristic data.

Portable reader 60 may be suitably programmed to retrieve or acquire automatically the data from measuring device 40. In some embodiments, portable reader 60 may be programmed to perform a reading process to read measuring device 40. The reading process may determine whether measuring device 40 has collected identity/testing, performance, and/or characteristic data. The reading process may begin when reader/writer 66 receives data from site identifier 20. The reading process may end when measuring device 40 has collected the data. Portable reader 60 may be programmed to retrieve or acquire the data from measuring device 40 after the data reading has substantially stabilized.

The reading process may end after a predetermined amount of time if measuring device 40 does not collect the identity/testing, performance, and/or characteristic data, and/or does not collect a substantially stabilized reading. Portable reader 60 may alert the user if the data has not been acquired in the predetermined time. The alert may include resetting portable reader 60 and/or prompting the collection of the data at block 122. Screen 62 of portable reader 60 may indicate that data was transmitted from measuring device 40 to portable reader 60. Portable reader 60 may be suitably programmed to acquire the identity/testing, performance, and/or characteristic data collected over the interval at block 122 from measuring device 40.

Now turning to block 130 in FIG. 4, portable reader 60 may compare, compute, and/or analyze the data. Portable reader 60 may perform one or more tests in real time and/or onsite at or around inspection site 14. The tests may include validation and/or interpretation of data. Portable reader 60 may be suitably programmed to compare identity/testing, performance, and/or characteristic data collected at block 122 from measuring device 40.

At block 132, portable reader 60 may compare the data acquired at block 122 with one or more identity/testing information, one or more performance parameters, and/or one or more characteristics acquired at block 120 to validate the performance data acquired at block 124. The validation of data may be performed onsite and/or in real time. The validation of data may provide real-time feedback of the reliability and/or accuracy of the data acquired at block 122. Portable reader 60 may alert a user as required if problems exist with the reliability and/or accuracy of the data acquired at block 124.

In some embodiments, comparing the data stored with site identifier 20, with data stored with portable reader 60, as described at block 120, may help validate the data collected by confirming onsite that the data was collected at the correct inspection site 14 in the correct order, etc. In some embodiments, validation of identity/testing, performance, and/or characteristic data may include portable reader 60 determining that the data may be out of range. For example, the current pipe or wall thickness acquired at block 124 may be compared to the nominal pipe or wall thickness corresponding to the selected inspection site 14. In some embodiments, if the current pipe or wall thickness is plus or minus about 12.5% of the nominal pipe or wall thickness, then the current pipe or wall thickness data may be out of range.

In some embodiments, validation of data may include portable reader 60 determining if measuring device 40 collected imprecise and/or inaccurate data (e.g., it took a "bad" or faulty reading). For example, the current pipe or wall thickness acquired at block 124 may be above the nominal pipe or wall thickness of the corresponding inspection site 14. In some embodiments, when the current pipe or wall thickness is greater than about 0.005 of nominal pipe or wall thickness, measuring device 40 collected bad or faulty data.

One or more responses may occur based on the validation of the data acquired at block 124. If the data is determined to be invalid (for example, out of range, inaccurate, and/or imprecise) and/or the data collected is determined to be bad or faulty, then portable reader 60 may prompt measuring device 40 or the user to acquire or collect new data at block 122. In some embodiments, portable reader 60 may automatically prompt measuring device 40 to collect a new current pipe or wall thickness reading. Invalid performance data readings also may mean a problem exists with measuring device 40 or elsewhere in system 10. In response, appropriate changes, tuning, calibrations or adjustments may be made to system 10, such as, moving, adjusting, replacing, repairing, etc. measuring device 40 and/or system 10.

At block 134, portable reader 60 may compare the data acquired at block 124 with data acquired at block 120 to interpret the data acquired at block 124. The interpretation of data may be performed onsite and/or in real time. That interpretation may provide real-time feedback of the status of pipe network 12, other equipment 35, and/or of system 10. Portable reader 60 may alert a user as required based on the interpretation.

For example, in some embodiments, the interpretation of the data may determine if pipe network 12 is at optimal performance. Portable reader 60 may determine that the current pipe or wall thickness acquired at block 124 is moderately or severely below the nominal pipe or wall thickness corresponding to inspection site 14. The portable reader also may determine the current pipe or wall thickness acquired at block 124 is below the minimal level of thickness for the pipe of the corresponding inspection site 14. Portable reader 60 may be configured to only interpret data determined to be valid at block 132.

One or more responses may occur based on the interpretation of data acquired at block 124. The data may signal that pipe network 12 and/or other equipment 35 is not at optimal performance. In response, appropriate changes, tuning, calibrations, or adjustments may be made. In response, a user may adjust, replace and/or repair the pipes, flanges, etc., in pipe network 12 and/or other equipment 35. The performance and/or characteristic data may alert a user that a problem exists with one or more components of system 10. For example, a faulty portable reader 60 or measuring device 40 may exist. In response, appropriate changes, replacements, repairs, tuning, or adjustments may be made to system 10. Alternatively, or additionally, portable reader 60 may compare data acquired in block 120 and/or block 122 with one or more standards, such as one or more standard characteristics.

At block 140, data may be transmitted (e.g., written to) to site identifier 20 using reader/writer 66. In some embodiments, updated data may be transmitted to site identifier 20 (e.g., the memory module) associated with the selected inspection site 14 for storage. For example, the performance and/or characteristic data acquired at block 124 and the date on which the performance and/or characteristic data was collected at block 122 and/or acquired at block 124 may be transmitted to the selected site identifier 20 for storage. The identity of the last user who performed an inspection corresponding to inspection site 14 also may be transmitted (e.g., written to) site identifier 20. In this manner, site identifier 20 may maintain a historical record of one or more performance parameters and/or one or more characteristics that are unique to such inspection site 14 associated with site identifier 20.

Portable reader 60 may be locked manually and/or automatically to prevent overwriting of data stored in internal on-board memory 68 and/or to prevent measuring device 40 from collecting performance data. Portable reader 60 may lock data associated with a selected site identifier 20 after reader/writer 66 has transmitted data to such site identifier 20. Portable reader 60 may be locked manually, e.g., using keys 64. Alternatively, or additionally, the portable reader may be configured to lock automatically after a predetermined delay.

Screen 62 of portable reader 60 may indicate in any suitable way(s) that portable reader 60 is locked.

Portable reader 60 may be unlocked to allow for modification of stored data, removal of stored data, and/or to allow measuring device 40 to collect performance data. Portable reader 60 may be unlocked manually. Alternatively, or additionally, the portable reader may be suitably programmed to unlock for a selected inspection site 14 after data may be transmitted from site identifier 20 associated with the selected inspection site 14 to reader/writer 66.

In some embodiments, portable reader 60 may be suitably programmed to verify whether data, such as one or more updated performance parameters and/or one or more updated characteristics, have been written to site identifier 20. For example, portable reader 60 may provide an alert if portable reader 60 has not written to site identifier 20 after a predetermined time. The predetermined time may be some time interval after portable reader 60 validated the data at block 132 and/or interpreted the data in 134. The alert may include prompting the collection of new data at block 122 and/or discrediting the data already collected and stored in portable reader 60. This verification may confirm that data was collected at inspection site 14. That verification may confirm that the data was validated by using the identity/testing, performance, and/or characteristic data stored on site identifier 20.

At block 142, data may be transmitted, sent, or uploaded to remote database 70 for storage, analysis, etc. Returning to block 116, another inspection site 14 may be selected for monitoring. Referring again to FIG. 2, a user at inspection site 14*a* may select to monitor inspection site 14*b*, 14*c*, 14*d*, or 14*e*. The unitary portable instrument including portable reader 60 may be transported to the next-selected inspection site 14. The steps disclosed at blocks 110-140 may be repeated for inspection site 14*b*, 14*c*, 14*d*, and/or 14*e* as necessary.

Additionally, the steps discussed above may be performed in different sequences and in different combinations, not all steps being required for all embodiments of the method. For example, characteristic data acquired from the memory module may be compared with standard characteristic data without performing any measurements using the measuring device. Alternatively, characteristic data acquired from the measuring device may be compared with standard characteristic data without performing any reading of the memory module.

Figure 5:
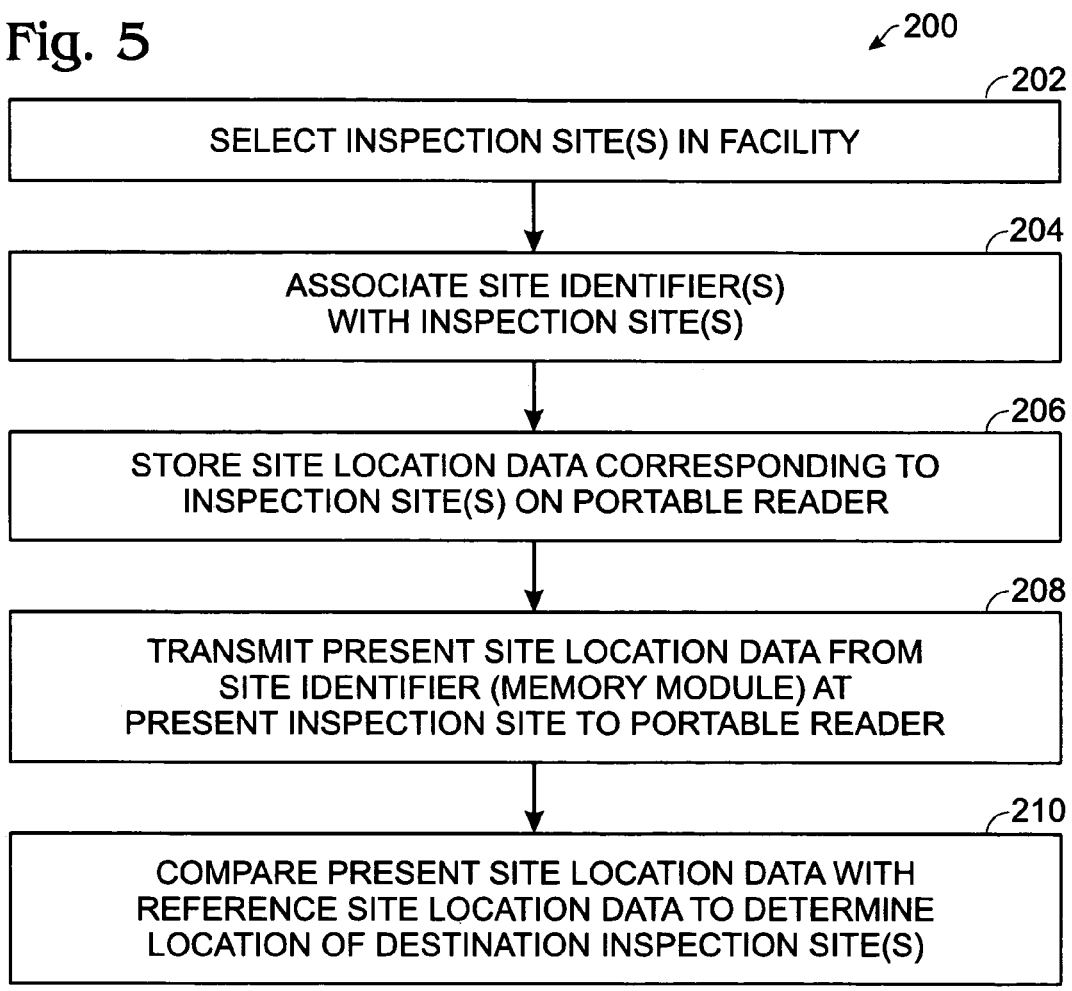
FIG. 5 is a flow chart depicting an example of a method for determining location of inspection sites.

FIG. 5 shows an example of a method 200 for determining the location of inspection sites 14 along pipe network 12 and/or other equipment 35. At block 202, site location data may be associated with one or more inspection sites 14 selected at block 110. Location device 50 may be used to determine site location data for one or more inspection sites 14. Blueprints, survey tools (i.e., lasers), and/or any manual or other method to determine site location data also may be used.

In some embodiments, site location data may be determined while onsite or while associating site identifier 20 with inspection site 14 at block 114 in FIG. 4. Site location data may be associated with inspection site 14, site identifier 20, and/or target 30 in any suitable way in, on, near, adjacent to, and/or along pipe network 12 and/or other equipment 35 at any suitable point, position, location, spot, place, etc. Any method described, and/or other suitable method, may be employed to determine site location data of one or more inspection sites 14. Any of the various site location data described above may be associated with a corresponding site inspection site 14.

At block 204 of FIG. 5, one or more site identifiers 20 (e.g., the memory module) associated with inspection site 14 may store the determined site location data corresponding to such inspection site 14. Site location data may be stored in a machine-readable format, as a barcode, as electronic data, and/or in any other suitable format. Using FIG. 2 as an illustration, inspection sites 14*a*, 14*b*, 14*c*, 14*d*, and 14*e* may be selected. Site location data for inspection site 14*a* may be stored at site identifier 20 associated with inspection site 14*a*. Likewise, site location data for 14*b* may be stored at inspection site 14*b*, etc.

At block 206 of FIG. 5, the determined site location data for one or more inspection sites 14 may be sent to a database accessible from any inspection site 14. In the illustrated embodiment, the database may be stored in internal on-board memory 68 in portable reader 60. The database also may be stored on one or more site identifiers 20 and/or on remote database 70. The site location data may include reference site location data. The reference site location data may be one or more fixed locations, including any suitable inspection site 14 and/or any other suitable location. Again using FIG. 2 as an example, site location data corresponding to one or more of inspection sites 14*a*, 14*b*, 14*c*, 14*d*, and 14*e* may be stored in portable reader 60.

The site location data at blocks 202 and 204 may be used to determine the location of inspection sites 14 along pipe network 12. For example, the site location data may be used to determine the location of the inspection site selected for monitoring at block 116 of FIG. 4. At block 208 of FIG. 5, site location data may be transmitted from site identifier 20 (e.g., the memory module) at a present inspection site 14 to portable reader 60. Reader/writer 66 of portable reader 60 may be used to acquire site location data from site identifier 20. In some embodiments, portable reader 60 may be configured to read a bar-code storing site location data associated with inspection site 14.

At block 210, portable reader 60 may compare site location data from the present inspection site 14 to reference site location data to determine the location of a destination inspection site. In one embodiment, keys 64 on portable reader 60 may be used to select any suitable destination inspection site 14 stored in portable reader 60. In this manner, a location, e.g., a relative distance value and a relative direction value, between the present inspection site and the destination inspection site may be determined.

Additionally, or alternatively, a user may locate the destination inspection site from the present inspection site in real time. When site location data is stored in portable reader 60 and/or at one or more inspection sites 14 associated with pipe network 12 and/or other equipment 35, location device 50 may not be needed for determining a location of a destination inspection site 14. Additionally, the steps discussed above may be performed in different sequences and in different combinations, not all steps being required for all embodiments of the method.

In some embodiments, the relative distance value and the relative direction value determined by portable reader 60 may be adjusted for increased precision and/or accuracy. For example, current GPS, Galileo, or other location technology may be unable to provide exact or pinpoint coordinates corresponding to an actual location. Site location data (e.g., GPS coordinates) determined for one or more inspection sites 14 may therefore be off by a few degrees, feet, etc. relative to the exact or pinpoint coordinates of the actual location of inspection site 14 in pipe network 12. Accordingly, the relative distance value and/or the relative direction value determined by portable reader 60 between the present inspection site 14 and the destination inspection site 14 may be off by a few degrees, feet, etc.

Portable reader 60 may be suitably programmed to allow a user to enter data to account for any disparity between the location of the destination inspection site 14 determined by portable reader 60 and the actual location of the destination inspection site 14. The data may be input into portable reader 60 onsite. Portable reader 60 may reconfigure in real-time the relative distance value and the relative direction value to substantially correspond with the exact or pinpoint coordinates of the actual location.

In another example, facility F may be generally positioned and/or angled at some degree of deviation relative to a true north reading. A true north reading may be obtained using a magnetic compass or other suitable means. The degree of deviation from true north may be determined by using a compass, blueprints of facility F, etc., or using any other suitable method. The degree of deviation may be recorded as the degree that facility F, etc. is positioned or angled relative to true north.

Site location data determined from GPS may be based on a true north reading. The location (e.g., the relative distance value and the relative direction value) determined by portable reader 60 between the present inspection site and the destination inspection site may be based on a true north reading. Accordingly, the location determined by portable reader 60 may be inaccurate by whatever degree of deviation the facility F, etc., is angled or positioned relative to true north.

Portable reader 60 may be suitably programmed to allow a user to input data to substantially account for the degree of deviation facility F, etc. is from true north. The inputted data may be the degree that facility F, etc. is positioned or angled relative to true north. The data may be inputted into portable reader 60 onsite. Portable reader 60 may reconfigure in real-time the relative distance value and the relative direction value to substantially account for the degree of deviation of facility F relative to true north.

Using FIG. 2 as an example, inspection site 14a may be the present inspection site, inspection site 14b may be the destination inspection site, and inspection site 14b also may be the reference site location data. The location data for the present inspection site 14a may be retrieved from the database in portable reader 60. Keys 64 may be used to select destination inspection site 14b. Portable reader 60 compares site location data for present inspection site 14a to reference site location data of inspection site 14b to determine a location of destination inspection site 14b. Portable reader 60 may calculate a distance value and a direction value between present inspection site 14a and destination inspection site 14b. Portable reader 60 may adjust the calculated distance value and direction value as described above. In some embodiments, inspection site 14c, 14d, and/or another location may serve as the reference site location data.

In some embodiments, location device 50 may be associated and/or coupled with the database stored on portable reader 60 to determine the location of a destination inspection site 14. The user may take a location-data reading from any location using location device 50. This reading may serve as the reference point. A user may then use keys 44 on portable reader 60 to select a destination inspection site. As described in the last paragraph, portable reader 60 may then calculate a distance value and a direction value between a present inspection site 14 and the destination inspection site 14. In some embodiments, a location of a destination inspection site 14 may be determined using only the site location data stored on portable reader 60.

In some embodiments, a location of a destination inspection site 14 may be determined using a combination of GPS and/or Galileo coordinates with user-defined values. For example, the GPS and/or Galileo coordinates may be used to determine a selected location near one or more inspection sites 14. The user-defined values may then define and/or be used to determine the distance and the direction of the one or more inspection sites 14a relative to the selected location.

System 10 is not limited to the systems, apparatus, and methods depicted in FIGS. 1-4. In some embodiments, system 10 may be used for locating and/or monitoring fugitive emissions inspection sites along pipe network 12. Fugitive emissions may generally include leaks from, or in the connections between, flanges, pipes, pumps, compressors, valves, vessels, pressure vessels, etc. System 10 may include any suitable combination of components described above, including a site identifier 20 (such as a memory module) associated with one or more fugitive emissions inspection sites, and a measuring device.

In some embodiments, the memory module may allow for storage and retrieval of one or more performance (or historical or unique performance) parameters corresponding to a fugitive emissions inspection site in system 10. For example, the memory module may allow for storage and retrieval of a unique fugitive emissions inspection site identifier corresponding to the fugitive emissions inspection site, location data corresponding to the fugitive emissions inspection site, material types corresponding to the fugitive emissions inspection site, diameters corresponding to the fugitive emissions inspection site, flow rates corresponding to the fugitive emissions inspection site, torque values corresponding to the fugitive emissions inspection site, historical emission readings corresponding to the fugitive emissions inspection site, and/or other suitable data corresponding to the fugitive emissions inspection site.

The measuring device may be configured to monitor for fugitive emissions. The measuring device may be configured to collect performance data including a fugitive emissions value. The performance data, including the fugitive emissions value, may be acquired by portable reader 60 in any manner described above, i.e., manually, automatically, etc. In some embodiments, the measuring device may not be connected to and/or in communication with portable reader 60. The performance data may be manually entered into portable reader 60 in those instances.

A method for monitoring fugitive emissions may be similar to the method already described above. In some embodiments, reader/writer 66 may acquire the one or more performance parameters from a site identifier 20 associated with a selected fugitive emissions inspection site 14. Portable reader 60 may be configured to prompt the user to collect performance data in response to sensor 46 acquiring the one or more performance parameters.

The measuring device may be used to measure and/or collect performance data including one or more fugitive emissions values. The collected performance data may then be manually entered into portable reader 60, e.g., using keys 64. Portable reader 60 may be configured to provide an alert if performance data has not been entered into portable reader 60 after a predetermined time. Portable reader 60 may be configured to prompt a user to communicate (write) one or more updated performance parameters to site identifier 20. Portable reader 60 may be configured to provide an alert if the one or more updated performance parameters have not been written to site identifier 20 after a predetermined time. The alert may include erasing the collected performance data and/or prompting the user to again collect performance data using the measuring device.

In some embodiments, system 10 may be used for materials tracking, including for locating pipes, pumps, compressors, valves, flanges, machines, and/or any other equipment. System 10 may include any suitable combination of components described above, including a site identifier 20 (such as a memory module) associated with one or more materials tracking inspection sites 14. In some embodiments, the memory module may allow for storage and retrieval of data corresponding to the materials tracking inspection site 14. For example, the memory module may allow for storage and retrieval of a unique material tracking inspection site identifier, location data for the materials tracking inspection site 14, historical tracking data corresponding to the materials tracking inspection site 14, and/or suitable data.

In some embodiments, system 10 may be used to ensure proper replacement of equipment. For example, the system may ensure that a second equipment is a suitable replacement for a first equipment. "Suitable replacement," as used herein, means that the second equipment is expected to perform at least substantially similar to the first equipment when subjected to the same operating conditions (such as type(s) of fluids transported or contained, operating pressures, operating temperatures, etc.) as the first equipment. System 10 may be able to determine if the second equipment is a suitable replacement for the first equipment by, for example, comparing one or more characteristics of the second equipment with one or more characteristics of the first equipment, and determining if the one or more characteristics of the second equipment match, are equivalent to, and/or are greater than or less than the one or more characteristics of the first equipment.

Figure 6:
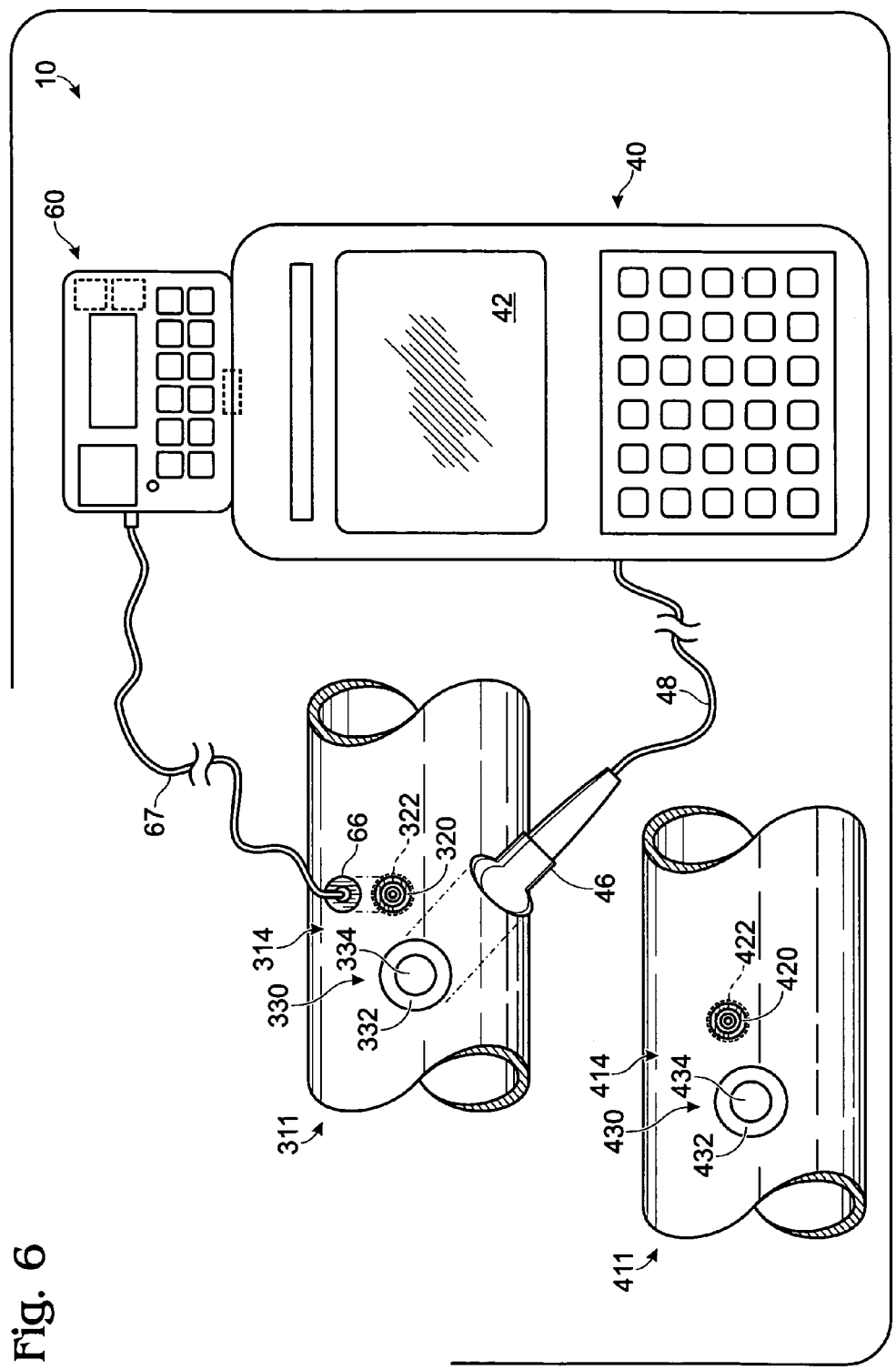
FIG. 6 is a schematic view of the system of FIG. 1 being used for replacing equipment.

For example, system 10 may be used to determine if second equipment 411 is a suitable replacement for first equipment 311, as shown in FIG. 6. The first and second equipment may be any suitable equipment, such as pipes (or sections of pipe), flanges, fasteners, vessels, pressure vessels, equipment supports, pipe racks, pumps, compressors, etc. First equipment 311 and second equipment 411 may be at two or more inspection sites 14. For example, first equipment 311 may be at a first inspection site 314 and second equipment 411 may be at a second inspection site 414. The first and second equipment may be at any suitable locations. For example, first equipment 311 may be connected to pipe network 12, while second equipment 411 may be in inventory or in a warehouse. Alternatively, first equipment 311 may be connected to pipe network 12 and second equipment 411 may be connected to a separate portion of the pipe network.

System 10 may include any suitable combination of components described above. For example, system 10 may include site identifiers 20 and targets 30 that may be associated with inspection sites 14. For example, a first site identifier 320 and a first target 330 may be associated with or attached at first inspection site 314, and a second site identifier 420 and a second target 430 may be associated with or attached at second inspection site 414, as shown in FIG. 6.

The first and second site identifiers may be memory modules, as discussed above. When those site identifiers are memory modules, they may be referred to as first and second memory modules that may be associated with the first and second equipment, respectively. As discussed above, the first and second memory modules may be configured to store data, such as one or more identity/testing information, one or more characteristics, and/or one or more performance parameters corresponding to the first and second inspection sites (which may be associated with the first and second equipment).

The first and second targets may include target rims 32 and holes 34, as discussed above. For example, the first target may include a first target rim 332 and a first hole 334, and the second target may include a second target rim 432 and a second hole 434. System 10 also may include covers 22 for the site identifiers, such as a first cover 322 and a second cover 422.

Portable reader 60 may be configured to read the first and second memory modules and compare the read one or more second characteristics with the read one or more first characteristics to determine if second equipment 411 is a suitable replacement for first equipment 311. For example, the portable reader may determine whether the one or more second characteristics match, are equivalent, or are greater than or less than the one or more first characteristics. Alternatively, or additionally, the portable reader may be configured to read the memory module associated with either the first equipment or the second equipment, and then compare the read characteristics from that module to characteristics measured by measuring device 40 for the other equipment to determine if either the first or second equipment is a suitable replacement for the other equipment.

When the one or more first characteristics include a first material classification, and the one or more second characteristics include a second material classification, the portable reader may be configured to determine if the second material classification matches, or is an acceptable equivalent to, the first material classification. Alternatively, or additionally, the portable reader may be configured to determine if the percentage compositions of one or more elements of the second equipment matches or is within an acceptable range of the percentage compositions of one or more elements of the first equipment.

Additionally, or alternatively, portable reader 60 may be associated with measuring device 40 and/or may be configured to store one or more first characteristics measured by the measuring device on the first memory module, and/or to store one or more second characteristics measured by the measuring device on the second memory module. The portable reader may erase any existing characteristics stored on the memory modules before storing the measured characteristics, or may add the measured characteristics to the data already stored on the memory modules.

Measuring device 40 may be configured to measure one or more first characteristics of the first equipment and/or one or more second characteristics of the second equipment. For example, the measuring device may be configured to perform an x-ray fluorescence to measure percentage compositions of one or more elements of the first equipment and the second equipment. In some embodiments, the measuring device (and/or the portable reader) may be further configured to determine a first material classification of the first equipment and/or a second material classification of the second equipment based, at least in part, on the measured percentage compositions of one or more elements.

FIG. 7 shows an example of a method 500 of replacing equipment. The first target and/or the first site identifier may be associated with the first equipment at 502 and 504, respectively.

One or more first characteristics of the first equipment may be measured at 506. Those characteristics may be referred to as "measured first characteristics." The first characteristic(s) may be measured in any suitable way(s). For example, percentage compositions of one or more elements of the first equipment may be measured, such as 0.486% Mo, 97.08% Fe, 0.639% Mn, and 1.23% Cr, and then material of the first equipment may be classified, such as 1¼ Cr.

The measured first characteristics may then be stored on the first memory module associated with the first equipment at 508. In some embodiments, existing first characteristics already stored on the first memory module may be erased before storing the measured first characteristics. Alternatively, the measured first characteristics may be added to the existing first characteristics. The first memory module may be read by the portable reader and the first characteristic(s) may be transmitted to the portable reader at 510. The first characteristics read by and/or transmitted to the portable reader may be referred to as "read first characteristics."

Similar steps may be taken for the second equipment. For example, the second target and/or the second site identifier may be associated with the second equipment at 512 and 514, respectively.

One or more second characteristics of the second equipment may be measured at 516. Those characteristics may be referred to as "measured second characteristics." The second characteristic(s) may be measured in any suitable way(s). For example, percentage compositions of one or more elements of the second equipment may be measured, and then material of the second equipment may be classified.

The measured second characteristics may then be stored on the second memory module associated with the second equipment at 518. In some embodiments, existing second characteristics already stored on the second memory module may be erased before storing the measured second characteristics. Alternatively, the measured second characteristics may be added to the existing second characteristics. The second memory module may be read by the portable reader and the second characteristic(s) may be transmitted to the portable reader at 520. The second characteristics read by and/or transmitted to the portable reader may be referred to as "read second characteristics."

The first and second characteristic(s) may then be compared at 522 and the suitability of replacing the second equipment for the first equipment, or vice-versa, may be determined at 524. In some embodiments, the first characteristics may include the first material classification, and the second characteristics may include the second material classification. In those embodiments, comparing the first and second characteristics may include comparing those material classifications, and/or determining suitability of replacement may include determining whether the material classifications match or are equivalent.

Additionally, the steps discussed above may be performed in different sequences and in different combinations, not all steps being required for all embodiments of the method. For example, where a target and/or site identifier has already been associated with the first and second equipment, and the characteristics already measured and stored for the first and second equipment, then the method may skip those steps and may include reading the memory modules, comparing the characteristics, and determining suitability of replacement. Alternatively, when the characteristics for one of the first and second equipment has already been measured and stored, then the method may involve reading the stored characteristics of one of the first and second equipment, comparing the stored characteristics with measured characteristics of the other equipment, and determining suitability of replacement.

While embodiments of a system, apparatus, and methods of use thereof have been particularly shown and described, many variations may be made therein. This disclosure may include one or more independent or interdependent inventions directed to various combinations of features, functions, elements, and/or properties, one or more of which may be defined in the following claims. Other combinations and subcombinations of features, functions, elements, and/or properties may be claimed later in this or a related application. Such variations, whether they are directed to different combinations or directed to the same combinations, whether different, broader, narrower or equal in scope, are also regarded as included within the subject matter of the present disclosure. An appreciation of the availability or significance of claims not presently claimed may not be presently realized. Accordingly, the foregoing embodiments are illustrative, and no single feature or element, or combination thereof, is essential to all possible combinations that may be claimed in this or a later application. Each claim defines an invention disclosed in the foregoing disclosure, but any one claim does not necessarily encompass all features or combinations that may be claimed.

Where the disclosure recites "a" or "a first" element or the equivalent thereof, such recitations include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Inventions embodied in various combinations and subcombinations of features, functions, elements, and/or properties may be claimed through presentation of claims in a related application. Such claims, whether they are directed to different inventions or directed to the same invention, whether different, broader, narrower or equal in scope to the other claims, are also regarded as included within the subject matter of the present disclosure.

What is claimed is:

1. A system for replacing equipment, comprising:
   a first memory module associated with a first equipment, the first memory module configured to store one or more first characteristics of the first equipment;
   a second memory module associated with a second equipment, the second memory module configured to store one or more second characteristics of the second equipment;
   a portable reader configured to read the first and second memory modules and to compare the read one or more second characteristics with the read one or more first characteristics to determine if the second equipment is a suitable replacement for the first equipment; and
   a measuring device configured to measure at least one of the one or more first characteristics and the one or more second characteristics, wherein the portable reader is associated with the measuring device, and is further configured to store the measured one or more first characteristics on the first memory module, and to store the measured one or more second characteristics on the second memory module.

2. The system of claim 1, wherein the first equipment is a first section of pipe, and the second equipment is a second section of pipe.

3. The system of claim 1, wherein the one or more first characteristics include a first material classification of the first equipment, and the one or more second characteristics include a second material classification of the second equipment.

4. The system of claim 3, wherein the portable reader is configured to determine whether the second material classification matches the first material classification.

5. The system of claim 1, wherein the first memory module is attached to the first equipment.

6. The system of claim 5, wherein the second memory module is attached to the second equipment.

7. The system of claim 5, wherein the second memory module is attached to a container that at least partially contains the second equipment.

8. The system of claim 1, wherein the portable reader is further configured to erase at least one of (a) existing first characteristics before storing the measured one or more first characteristics on the first memory module, and (b) existing second characteristics before storing the measured one or more second characteristics on the second memory module.

9. The system of claim 1, wherein the measured one or more first characteristics include a first material classification for the first equipment, and the measured one or more second characteristics include a second material classification for the second equipment.

10. The system of claim 9, wherein the measuring device is configured to perform an x-ray fluorescence to measure percentage compositions of one or more elements of the first equipment and the second equipment.

11. The system of claim 10, wherein the measuring device is further configured to determine the first and second material classifications based, at least in part, on the measured percentage compositions of one or more elements.

12. A method of replacing equipment, comprising:
storing one or more first characteristics of a first equipment on a first memory module associated with the first equipment;
transmitting the one or more first characteristics to a portable reader configured to read the first memory module;
measuring one or more second characteristics of a second equipment using a measuring device associated with the portable reader; and
comparing, with the portable reader, the measured one or more second characteristics with the read one or more first characteristics to determine if one of the first and second equipment is a suitable replacement for the other equipment, where the one or more first characteristics include a first material classification and the one or more second characteristics include a second material classification, wherein comparing the measured one or more second characteristics with the read one or more first characteristics includes determining whether the second material classification matches the first material classification.

13. A method of replacing equipment, comprising:
storing one or more first characteristics of a first equipment on a first memory module associated with the first equipment;
transmitting the one or more first characteristics to a portable reader configured to read the first memory module;
measuring one or more second characteristics of a second equipment using a measuring device associated with the portable reader; and
comparing, with the portable reader, the measured one or more second characteristics with the read one or more first characteristics to determine if one of the first and second equipment is a suitable replacement for the other equipment, wherein measuring one or more second characteristics of a second equipment includes:
measuring percentage compositions of one or more elements of the second equipment; and
classifying material of the second equipment based, at least in part, on the measured percentage compositions of the one or more elements.

14. A method of replacing equipment, comprising:
storing one or more first characteristics of a first equipment on a first memory module associated with the first equipment;
storing one or more second characteristics of a second equipment on a second memory module associated with the second equipment;
transmitting the one or more first characteristics to a portable reader;
transmitting the one or more second characteristics to the portable reader, the portable reader being configured to read the first and second memory modules; and
comparing, with the portable reader, the read one or more second characteristics with the read one or more first characteristics to determine if the second equipment is a suitable replacement for the first equipment, where the one or more first characteristics include a first material classification and the one or more second characteristics include a second material classification, wherein comparing the read one or more second characteristics with the read one or more first characteristics includes determining whether the second material classification matches the first material classification.

* * * * *